(12) United States Patent
Terlizzi

(10) Patent No.: US 8,489,026 B2
(45) Date of Patent: *Jul. 16, 2013

(54) SYSTEMS AND METHODS FOR NOISE CANCELLATION AND POWER MANAGEMENT IN A WIRELESS HEADSET

(71) Applicant: Jeffrey J. Terlizzi, San Francisco, CA (US)

(72) Inventor: Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,297

(22) Filed: Oct. 8, 2012

(65) Prior Publication Data

US 2013/0035040 A1  Feb. 7, 2013

Related U.S. Application Data

(63) Continuation of application No. 12/220,530, filed on Jul. 25, 2008, now Pat. No. 8,285,208.

(51) Int. Cl.
*H04B 7/00* (2006.01)

(52) U.S. Cl.
USPC ...... 455/41.2; 455/570; 455/575.2; 455/90.2; 455/3.05; 379/428.02; 379/430; 379/433.03; 381/71.1; 381/71.6; 381/74; 381/380; 381/381

(58) Field of Classification Search
USPC .............. 455/41.2, 41.3, 570, 575.1, 575.2, 455/569.1, 556.1, 90.2, 90.3, 3.05; 379/428.02, 379/430, 431, 433.03; 381/71.1, 71.6, 74, 381/370–380, 381
See application file for complete search history.

(56) References Cited

U.S. PATENT DOCUMENTS

| | | | |
|---|---|---|---|
| 4,653,102 | A | 3/1987 | Hansen |
| 7,010,332 | B1 | 3/2006 | Irvin et al. |
| 7,983,907 | B2 | 7/2011 | Visser et al. |
| 2001/0053228 | A1 | 12/2001 | Jones |
| 2003/0035551 | A1 | 2/2003 | Light et al. |
| 2006/0227984 | A1 | 10/2006 | Sinclair |
| 2008/0140868 | A1 | 6/2008 | Kalayjian et al. |
| 2009/0010451 | A1 | 1/2009 | Burnett |
| 2009/0103744 | A1 | 4/2009 | Klinghult et al. |
| 2009/0203318 | A1 | 8/2009 | Haan |
| 2009/0239591 | A1 | 9/2009 | Alameh et al. |
| 2010/0022269 | A1 | 1/2010 | Terlizzi |
| 2010/0022283 | A1 | 1/2010 | Terlizzi |
| 2010/0195842 | A1 | 8/2010 | Sibbald |

*Primary Examiner* — Shaima Q Aminzay
(74) *Attorney, Agent, or Firm* — Blakely, Sokoloff, Taylor & Zafman LLP

(57) ABSTRACT

This includes systems and methods for noise cancellation and power management in a wireless headset. The wireless headset can perform noise cancellation by using two or more omni-directional microphones to generate a noise canceling "cone." Audio signals received outside of the cone can be filtered out. An accelerometer can be used to determine the location of the wireless headset and the system can then properly position the cone to face the user's voice and filter out other audio signals. Additionally, by monitoring the ambient noise, the system can save power by turning off the noise cancellation system when the amount of ambient noise is below a threshold value.

16 Claims, 14 Drawing Sheets

1

SYSTEMS AND METHODS FOR NOISE CANCELLATION AND POWER MANAGEMENT IN A WIRELESS HEADSET

This application is a continuation of co-pending U.S. application Ser. No. 12/220,530 filed on Jul. 25, 2008.

FIELD OF THE INVENTION

This relates to methods and systems for noise cancellation and power management in a wireless headset.

BACKGROUND OF THE INVENTION

Cellular telephones and wireless headsets have rapidly become enjoyable and useful commodities utilized by a large percentage of the population. Since a purpose of these devices is to allow people to communicate clearly with one another in different environments, there is a need to create devices which produce a clear and understandable signal of the user's voice. More particularly, there is a need to create devices which can cancel outside noise and which can allow substantially only the user's voice to be heard by a second party. As used herein, the term "user" refers to a person who is using a cellular telephone and/or wireless headset and "second party" or "second parties" refer to persons with whom the user is communicating via the cellular telephone and/or wireless headset.

If a user is operating a wireless headset, the need for noise cancellation can become even more apparent than if the user were only using a cellular telephone. For example, wireless headsets and cellular telephones typically employ omni-directional microphones which pick up audio signals received from every direction. Since a wireless headset can be farther from a user's mouth than a cellular telephone, the probability of the wireless headset picking up ambient noise (i.e., any sounds other than the user's voice) can be increased in comparison to a cellular telephone, which is typically located closer to the user's mouth. Thus, there is a need for a wireless headset that, even though the wireless headset may be located relatively far from the user's mouth, can substantially "hear" or process only the user's voice.

Wireless headsets can have a relatively short battery life, especially if a noise cancellation feature were to be added to the wireless headset, generating increased power supply needs. Although one solution could be to simply use a larger battery in the wireless headset, this solution could result in a bulky device which is uncomfortable and bothersome to the user. Thus, as there is a need for devices that improve power management and can operate for longer periods of time while using the same size battery.

Accordingly, systems and methods are needed for improving the noise cancellation and power management abilities of a wireless headset.

SUMMARY OF THE DESCRIPTION

Systems and methods for improving the noise cancellation of a wireless headset can be provided in accordance with the present invention.

In accordance with some embodiments of the present invention, noise cancellation in a wireless headset can be improved by creating a directional microphone. By using two omni-directional microphones located on a single wireless headset, a wireless headset can create a directional, noise canceling "cone." Audio signals received by the wireless headset outside of this cone can be disregarded and filtered out by the system while audio signals received inside of the cone can be kept for further processing. In this manner, a directional microphone can be created out of two omni-directional microphones and, by pointing the cone at the user's mouth, noise cancellation can be substantially performed on ambient noise received from outside of the cone. Thus, a wireless headset that improves noise cancellation and can substantially hear only the user's voice can be created.

As used hereinafter, the term "microphone" is used to reference an omni-directional microphone (i.e., a microphone without directionality). A microphone with directionality is referenced by the term "directional microphone."

In some embodiments of the present invention, an accelerometer can be employed by the noise cancellation system to determine the direction in which the wireless headset is pointing. In this manner, operation of the noise cancellation system can be improved. For example, a user could potentially be wearing a wireless headset in different configurations, (e.g., the wireless headset may be facing towards the ground rather than towards the user's mouth). If the wireless headset cannot determine where the user's mouth is located, the directional microphone may be pointed away from the user's mouth and the user's voice may accordingly be outside of the cone and ignored by the wireless headset. By using an accelerometer, the noise cancellation system can determine the direction in which the wireless headset is pointing. If the noise cancellation system determines that the wireless headset is pointing away from the user's mouth, the noise cancellation system can widen the cone in order to ensure that the user's mouth is located within the cone and to ensure that the user's voice is not filtered out by the system. If, however, the noise cancellation system determines that the wireless headset is pointing towards the user's mouth, then the cone can be significantly narrowed and can filter out a greater amount of ambient noise.

In accordance with another embodiment of the present invention, more than two microphones can be employed to create several directional microphones that can collectively filter out ambient noise with greater accuracy than a two-microphone system. Once again, in order to improve the noise cancellation system, an accelerometer can be used to determine the direction in which the wireless headset is pointing and to help determine a suitable cone corresponding to that direction.

Additionally, systems and methods for improving the power management of a wireless headset can be provided in accordance with the present invention.

In some embodiments of the present invention, a digital signal processing (DSP) system can determine the ambient noise level in the vicinity of the wireless headset. If the ambient noise rises above a threshold value, the DSP system can turn on a noise cancellation system. If the DSP system determines that the ambient noise has dropped below the threshold value, the noise cancellation system can be turned off. By only turning on the noise cancellation system when the DSP system determines that a sufficient amount of ambient noise is present, the wireless headset can save power. Furthermore, additional power can be saved by the wireless headset if at least part of the DSP system is located in another device a handset, cellular telephone, computer system, etc.) that is in communication with the wireless headset, rather than being located directly in the wireless headset itself. In this manner, a substantial part of the necessary data processing, and a significant portion of the power usage associated with the data processing, can occur in the other device rather than in the wireless headset.

In accordance with other embodiments of the present invention, an accelerometer can be used by the system to determine when the wireless headset is being utilized by a user. If the system determines through the accelerometer that the wireless headset is not in use, the wireless headset or the noise cancellation system can be turned off to save power. Alternatively or additionally, the system can periodically check through the accelerometer if a wireless headset that has been turned off is now being employed by a user. In this scenario, the system can then turn the wireless headset back on.

In addition to being used for noise cancellation and power management, an accelerometer can be utilized by the wireless headset for other purposes. For example, in one embodiment of the present invention, the accelerometer can determine which side of the wireless headset is facing upwards, and the wireless headset can adjust button functions accordingly. For example, a user may intuitively expect a volume-up button to be on the top of a wireless headset and a volume-down button to be on the bottom of a wireless headset. Thus, the system can use the accelerometer to determine which side of the wireless headset is currently facing upwards, and direct the button on the upwards-facing side of the wireless headset to perform the volume-up function. Similarly, the system can use the accelerometer to determine which side of the wireless headset is currently facing downwards, and direct the button on the downwards-facing side to perform the volume-down function.

While aspects have been described with respect to a single embodiment, persons skilled in the art will appreciate that concepts of various embodiments can be combined in whole or in part.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION

Although particular embodiments and devices are described herein, one skilled in the art can appreciate that the concepts of the invention can be applied to different types of noise cancellation systems, different types of wireless headsets, and to devices other than wireless headsets.

Figure 1:
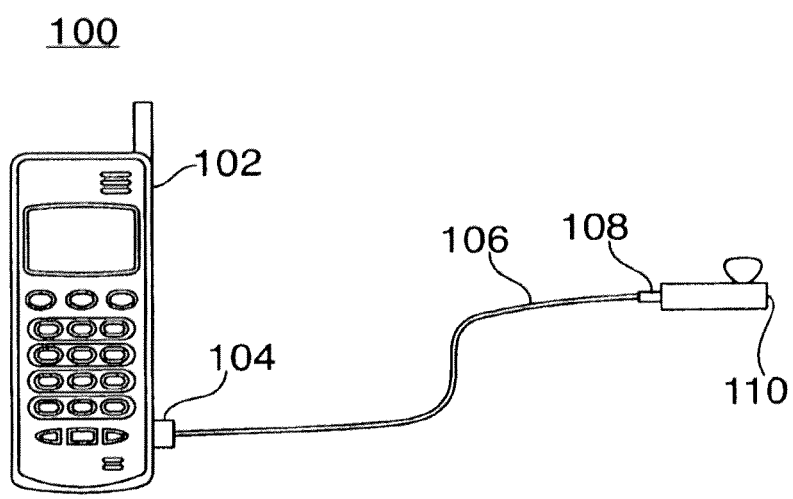
FIGS. 1-2B illustrate systems that can operate in accordance with some embodiments of the present invention.

FIG. 1 is a drawing depicting an illustrative wireless headset telephonic communication system 100 in accordance with an embodiment of the invention. System 100 can include telephone 102 and wireless headset 110, which can be electrically coupled to each other by way of cable 106. (As used herein, the term "coupled" should be understood to generically encompass both direct and indirect connections between two structures, including physical connection through intermediate mechanical modules, electrical modules, or any other suitable components or combinations thereof, as well as connections that are wireless or that can occur through communication passing through electrical modules, wiring, or any other suitable medium or combination thereof.)

Telephone 102 can be any appropriate type of telephone, including a cellular telephone, a landline-based telephone, an internet telephone that is adapted for use with a personal computer system or laptop, or any suitable combination thereof. Similarly, telephone 102 can be adapted to allow a user to initiate and maintain communications with a second party through the use of any appropriate communications standard, such as code division multiple access (CDMA), time division multiple access (TDMA), global system for mobile communications (GSM), voice over Internet Protocol (VoIP), or any suitable combination thereof. Such communications can occur through any appropriate intermediate devices, such as cellular telephone towers, signal repeaters, personal computers, Internet routers, or any suitable combination thereof. In addition, telephone 102 can include capabilities that are substantially unrelated to telephonic communications, such as the ability to download and play media (e.g., music or movies), the ability to download and run applications such as games and personal utilities, and any other suitable capabilities or combinations thereof.

Wireless headset 110 can allow a user to communicate with second parties through telephone 102 without the need to speak directly into or hear sound directly from telephone 102. That is, a user wearing wireless headset 110 can speak directly into wireless headset 110, which can communicate audio signals carrying information representing the speech of that user to telephone 102, which can transmit communication signals representing that speech to a device associated with a second party. Similarly, speech signals received from that second party by telephone 102 can be communicated to wireless headset 110, which in turn can convey such received speech signals to the user. Wireless headset 110 can be any appropriate headset that is adapted for use with telephone 102, and can include an earbud, a canalphone, closed or open headphones, supra-aural or circumaural headphones, or any other suitable combination thereof. In addition, wireless headset 110 can be adapted to communicate with telephone 102 using any appropriate form of communication, such as radio frequency (RF) transmission, or any other type of wired or wireless communication or combinations thereof. Further details of structures and features that can be implemented in wireless headset 110 will be discussed below in the following figures and descriptions.

In accordance with an embodiment of the invention, telephone 102 can be coupled to wireless headset 110 through cable 106. Cable 106 can be coupled to telephone 102 through connector 104, and can be coupled to wireless headset 110 through connector 108. Each of connectors 104 and 108 can be any appropriate type of connector, such as a traditional serial-port or parallel-port plug, a universal serial bus (USB)

plug, a plug that relies on at least one magnet to maintain a physical coupling to the corresponding device, or any suitable combination thereof. Alternatively or additionally, wireless headset 110 can be wirelessly coupled to telephone 102, in which case a physical embodiment of cable 106 is not necessary. Wireless headset 110 can be adapted for use with a personal computer (e.g., one that can communicate with another personal computer or any suitable networked device using, for example, VoIP), without the use of an intermediate telephone such as telephone 102. In such a scenario, wireless headset 110 can be operable to communicate with the personal computer using any appropriate configuration, such as through a cable coupled to a USB port of the personal computer or through a wireless configuration.

Figure 2A:
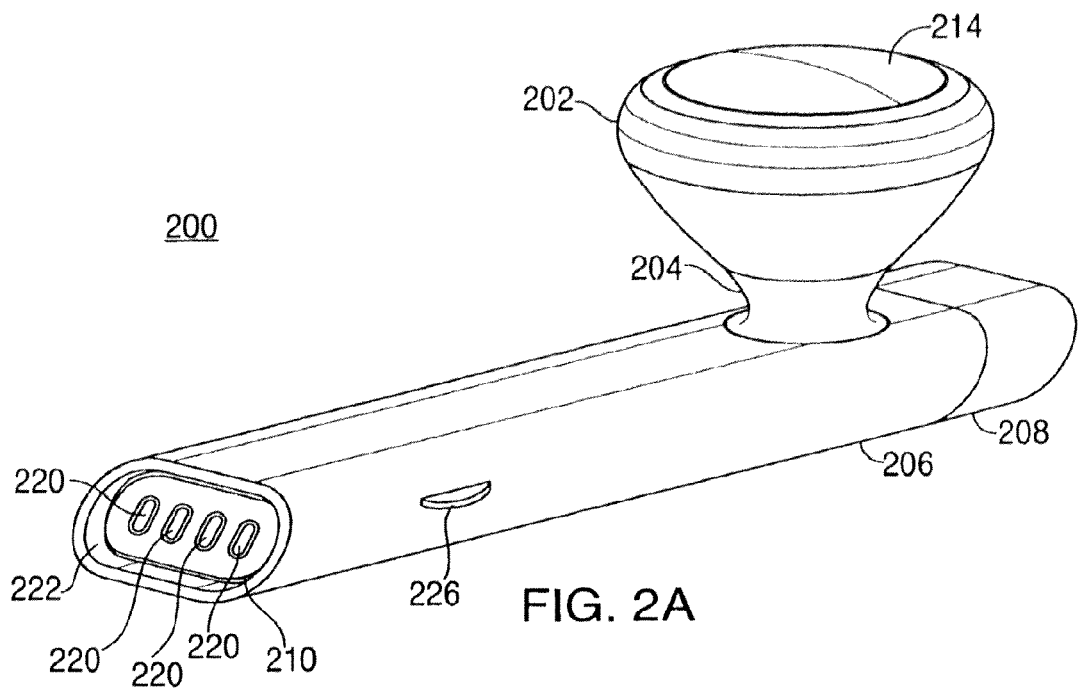
Figure 2B:
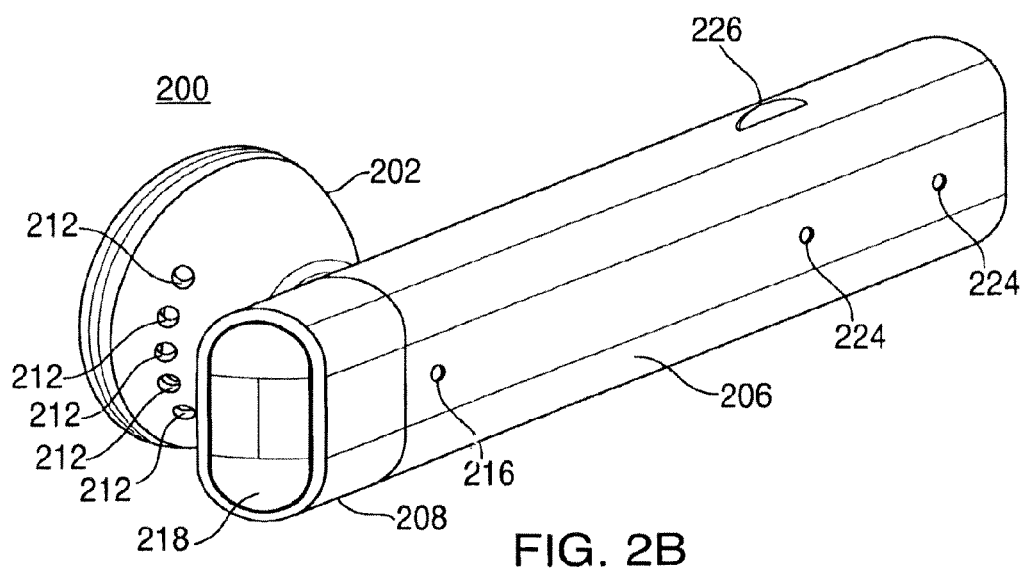

FIGS. 2A and 2B show perspective views of an illustrative wireless headset 200 in accordance with an embodiment of this invention. For example, wireless headset 200 can be used as wireless headset 110 of FIG. 1. Electrical, mechanical, and other components of wireless headset 200 can be enclosed in a housing, which can include a plurality of pieces that are assembled using any appropriate process, such as adhesive, screws, press fit, or any suitable combination thereof. Illustrative wireless headset 200 can include earbud body 202, earbud neck 204, tube 206, button body 208, and connector plate 210.

Earbud body 202 can include perforations (sometimes called acoustic ports) such as side port 212 and front port 214 that allow air to pass into and out of earbud body 202. For example, front port 214 can facilitate the passage of audio waves from a receiver located inside earbud body 202 to the ear of a user. Side ports 212, on the other hand, can facilitate the venting of acoustic pressure from inside earbud body 202 to the surrounding air. Earbud body 202 can be coupled to tube 206 by neck 204.

Tube 206 can include one or more microperforations 216. Button body 208 can be coupled to tube 206 and include button 218, which a user can manipulate to control wireless headset 200. Connector plate 210 can be coupled to the end of tube 206 that is opposite button body 208, and can include at least one contact 220 operable to be coupled to a cable for providing power, data, or both to wireless headset 200. In accordance with an embodiment of the invention, connector plate 210 and contact 220 (which can be substantially level with the face of connector plate 210) can be substantially recessed into tube 206, as shown by recessed portion 222. This recessed positioning can advantageously facilitate the coupling of connector plate 210 and contacts 220 with another connector (e.g., a connector at the end of a cable), where at least part of that other connector can be inserted into recessed portion 222 to mate with connector plate 210.

Wireless headset 200 can also contain located on, for example, tube 206, one or more microphones 224 that are operable to receive a user's voice. Microphones 224 are not limited to being located on tube 206, and alternatively could be located in any suitable area of wireless headset 200, such as neck 204, button body 208, connector plate 210, etc. Various configurations and functions for microphones 224 will be discussed in greater detail in the figures and descriptions to follow.

Additionally, wireless headset 200 can include one or more buttons 226 that are operable to receive a user input. Although each button 226 is illustrated in FIG. 2B as a wheel, buttons 226 could include any device capable of receiving an input from the user. For example, button 226 could include one or more of a push button, a switch, a touch-sensitive pad, etc. Also, similar to microphones 224, button 226 is not limited to being located on tube 206, and alternatively could be located in any suitable area of wireless headset 200.

Earbud body 202, earbud neck 204, tube 206, button body 208, and connector plate 210 can be constructed from any appropriate material including, for example, metal, plastic, silicone, rubber, foam, or any suitable combination thereof. As an example, earbud body 202 can be formed from a plastic element surrounded by a silicone seal, and tube 206 can be formed from aluminum. Similarly, earbud body 202, earbud neck 204, tube 206, button body 208, and connector plate 210 can be manufactured using any appropriate process (e.g., molding, casting, extrusion, or any suitable combination thereof). For example, earbud body 202, earbud neck 204, tube 206, button body 208, and connector plate 210 can be post-process cold-impressed to provide texture and other features on the inner surfaces of the bodies.

Figure 3:
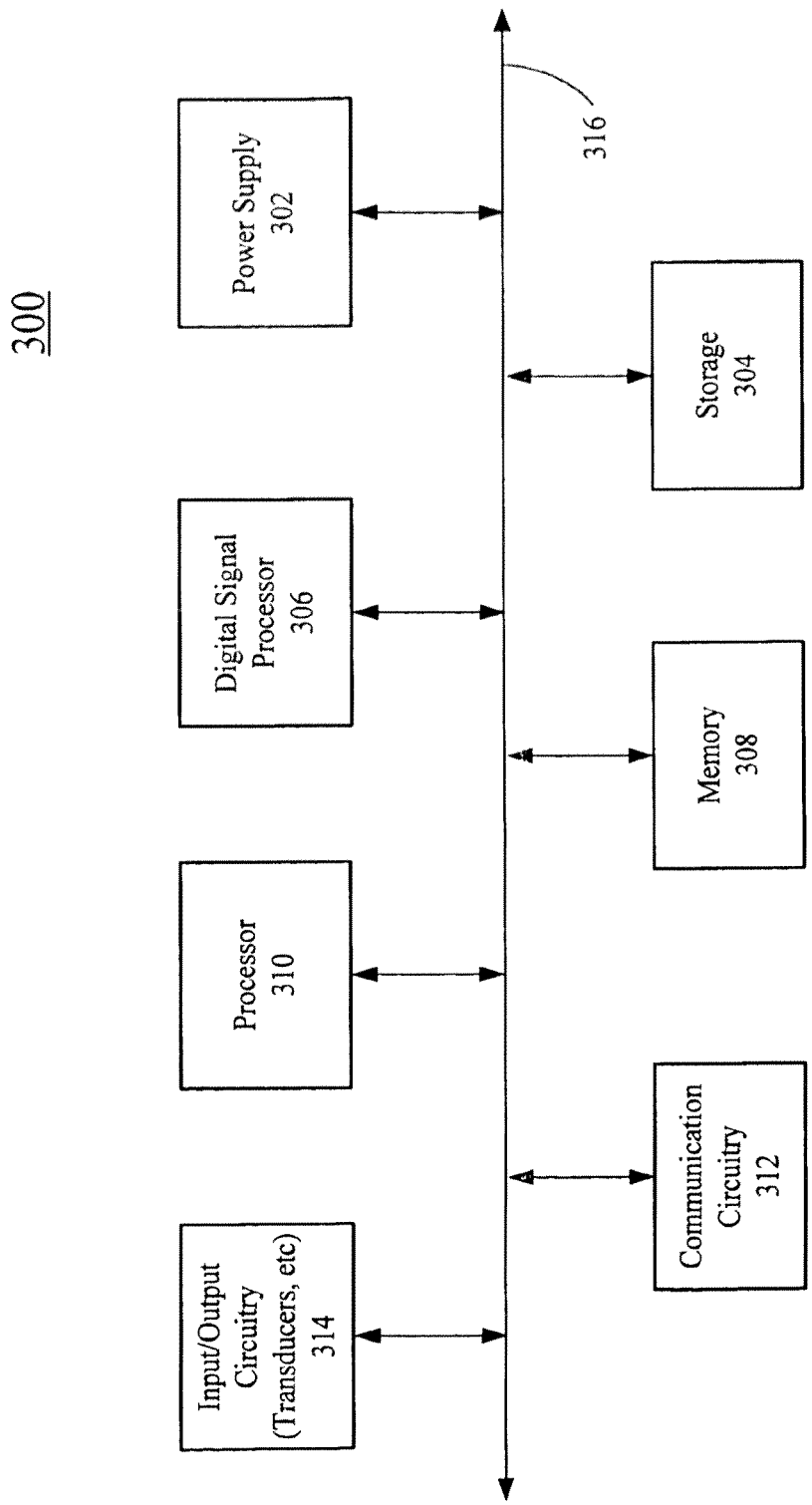
FIG. 3 is a simplified schematic block diagram of circuitry in accordance with some embodiments of the present invention.

FIG. 3 illustrates a simplified schematic diagram of an illustrative electronic device or devices in accordance with some embodiments of the present invention. For example, telephone 102 of FIG. 1, wireless headset 110 of FIG. 1, and wireless headset 200 of FIG. 2 are examples of systems that can include some or all of the circuitry illustrated by electronic device 300.

Electronic device 300 can include, for example, power supply 302, storage 304, digital signal processor 306, memory 308, processor 310, communication circuitry 312, and input/output circuitry 314. In some embodiments, electronic device 300 can include more than one of each component of circuitry, but for the sake of simplicity, only one of each is shown in FIG. 3. In addition, one skilled in the art would appreciate that the functionality of certain components can be combined or omitted and that additional or less components, which are not shown in FIGS. 1, 2A, and 2B, can be included in, for example, telephone 102, wireless headset 110, and wireless headset 200.

Power supply 302 can provide power to the components of device 300. In some embodiments, power supply 302 can be coupled to a power grid such as, for example, a wall outlet or automobile cigarette lighter. In some embodiments, power supply 302 can include one or more batteries for providing power to an electronic device. As another example, power supply 302 can be configured to generate power in an electronic device from a natural source (e.g., solar power using solar cells).

Storage 304 can include, for example, a hard-drive, flash memory, cache, ROM, and/or RAM. Additionally, storage 304 can be local to and/or remote from electronic device 300. For example, storage 304 can include integrated storage medium, removable storage medium, storage space on a remote server, wireless storage medium, or any combination thereof. Furthermore, storage 304 can store data such as, for example, system data, user profile data, and any other relevant data.

Digital signal processor 306 can be used for real-time processing of digital signals that are converted from analog signals by, for example, input/output circuitry 314. After processing of the digital signals has been completed, the digital signals could then be converted back into analog signals. For example, the digital signal processor 306 could be used to analyze digitized audio signals received from a wireless headset's microphones to determine how much of the audio signal is ambient noise and how much of the audio signal is, for example, a user's voice.

Memory 308 can include any form of temporary memory such as RAM, buffers, and/or cache, Memory 308 can also be used for storing data used to operate electronic device applications.

In addition to digital signal processor 306, electronic device 300 can additionally contain general processor 310. Processor 310 can be capable of interpreting system instructions and processing data. For example, processor 310 can be capable of executing programs such as system applications, firmware applications, and/or any other application. Additionally, processor 310 has the capability to execute instructions in order to communicate with any or all of the components of electronic device 300.

Communication circuitry 312 may be any suitable communications circuitry operative to initiate a communications request, connect to a communications network, and/or to transmit communications data to one or more servers or devices within the communications network. For example, communications circuitry 312 may support one or more of Wi-Fi (e.g., a 802.11 protocol), Bluetooth™ (trademark owned by Bluetooth Sig, Inc.), high frequency systems, infrared, GSM, GSM plus EDGE, CDMA, other cellular protocols, VoIP, FTP, P2P, SSH, or any other communication protocol and/or any combination thereof.

Input/output circuitry 314 can convert (and encode/decode, if necessary) analog signals and other signals (e.g., physical contact inputs, physical movements, analog audio signals, etc.) into digital data. Input/output circuitry 314 can also convert digital data into any other type of signal. The digital data can be provided to and received from processor 310, storage 304, memory 308, digital signal processor 306, or any other component of electronic device 300. Input/output circuitry 314 can be used to interface with any suitable input or output devices, such as, for example, button 218, buttons 226, or microphones 224 of FIG. 2. Furthermore, electronic device 300 can include specialized input circuitry associated with input devices such as, for example, one or more cameras, proximity sensors, accelerometers, ambient light detectors, etc. Electronic device 300 can also include specialized output circuitry associated with output devices such as, for example, one or more speakers, earphones, LED's, LCD's, etc.

Lastly, bus 316 can provide a data transfer path for transferring data to, from, or between processor 310, storage 304, memory 308, communications circuitry 312, and any other component included in electronic device 300. Although bus 316 is illustrated as a single component in FIG. 3, one skilled in the art would appreciate that electronic device 300 may include one or more components.

Figure 4:
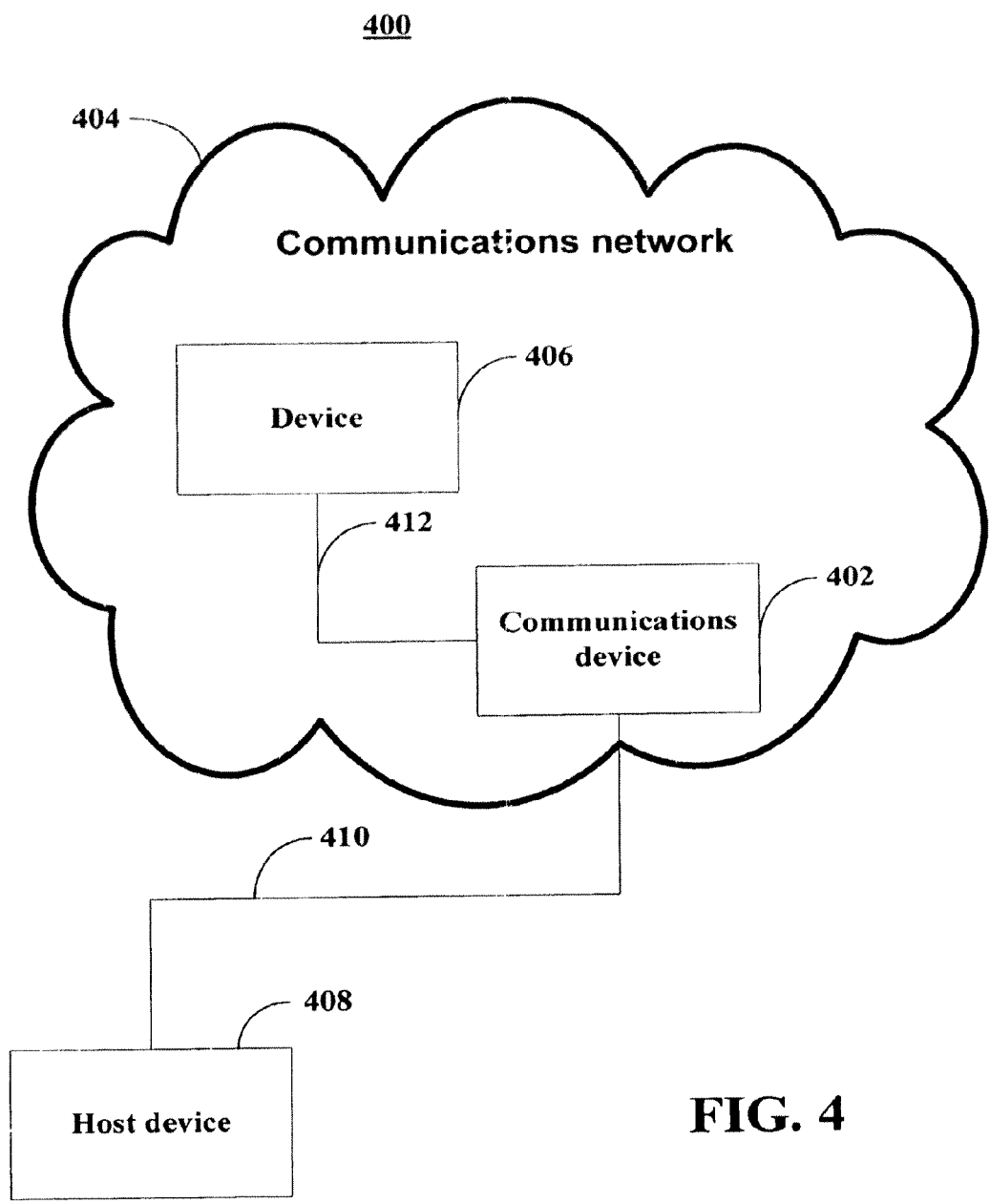
FIG. 4 is a simplified schematic view of a communications system in accordance with some embodiments of the present invention.

FIG. 4 is a schematic view of a communications system in accordance with one embodiment of the invention. Communications system 400 can include communications device 402 and communications network 404, which communications device 402 can use to perform wireless communications with other devices within communications network 404, such as device 406. Although communications system 400 can include several of communications devices 402, devices 406, and hosts 408, only one of each is shown in FIG. 4 to avoid overcomplicating the drawing.

Any suitable circuitry, device, system or combination of these (e.g., a wireless communications infrastructure including communications towers and telecommunications servers) operative to create a communications network can be used to create communications network 404. Communications network 404 can be capable of providing wireless communications using any suitable short-range or long-range communications protocol. In some embodiments, communications network 404 can support, for example, Wi-Fi (e.g., an 802.11 protocol), Bluetooth™, high frequency systems (e.g., 900 MHz, 2.4 GHz, and 5.6 GHz communication systems), infrared, other relatively localized wireless communication protocol, or any combination thereof. In some embodiments, communications network 404 can support protocols used by wireless and cellular telephones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VoIP or LAN. Communications device 402 and device 406, when located within communications network 404, can wirelessly communicate over a local wireless communication path such as path 412.

Communications device 402 and device 406 can be any suitable device for sending and receiving communications. For example, communications device 402 and device 406 could be any combination of one or more of telephone 102 of FIG. 1, wireless headset 110 of FIG. 1, and wireless headset 200 of FIG. 2. As another example, communications device 402 and device 406 can include a media player such as an iPod available by Apple Inc., of Cupertino, Calif., a personal e-mail or messaging device (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system). The communications sent and received can be any suitable form of communications, including for example, voice communications (e.g., telephonic communications), data communications (e.g., e-mails, text messages, media messages), or combinations of these.

In some embodiments, communications device 402 or device 406 can be coupled to host device 408 for data transfers, synchronizing communications device 402, software or firmware updates, or performing any other suitable operation that can require communications device 402 and host device 408 to be coupled. In some embodiments, several communications devices 402 can be coupled to host 408 to share data using host device 408 as a server. In some embodiments, communications device 402 can be coupled to several host devices 408, for example, for each of the plurality of host devices 408 to serve as a backup for data stored in communications device 402.

Communications device 402 can be coupled with host device 408 over communications link 410 using any suitable approach. For example, communications device 402 can use any suitable wireless communications protocol to connect to host device 408 over communications link 410. As another example, communications link 410 can be a wired link that is coupled to both communications device 402 and host device 408. As still another example, communications link 410 can include a combination of wired and wireless links (e.g., an accessory device for wirelessly communicating with communications device 402 is coupled by a wire to host device 408). Any suitable connector or docking station can be used to couple communications device 402 and host device 408.

As mentioned above, the present invention relates to systems and methods for noise cancellation and power management in a wireless headset. One method of creating a suitable noise cancellation system in a wireless headset can be achieved through the use of a system with two omni-directional microphones.

Figure 5A:
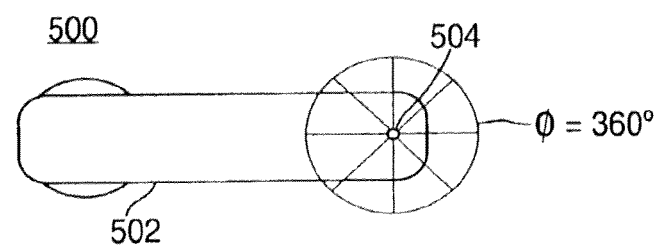
FIGS. 5A-5B illustrate a two-microphone system in accordance with some embodiments of the present invention.

FIG. 5A shows system 500, which includes a wireless headset 502 that utilizes a single, omni-directional microphone 504. This configuration is an example of a type of system that can typically be utilized by wireless headsets in the industry today. Since microphone 504 is omni-directional, microphone 504 can receive sounds arriving within an angle of Ø=360 degrees. In other words, microphone 504 can "hear" all sounds received from any direction. As a result, system 500 can not only hear the user's voice, but can also hear undesirable ambient noise received from other sources and received from directions other than the user's mouth. This can cause system 500 to transmit an audio signal to the second party which is unclear and difficult for the second party to understand. Thus, there is a need to create a wireless headset which can improve on system 500 and can transmit an audio signal to a second party that can be clearer and can contain less noise than a single, omni-directional microphone system.

Figure 5B:
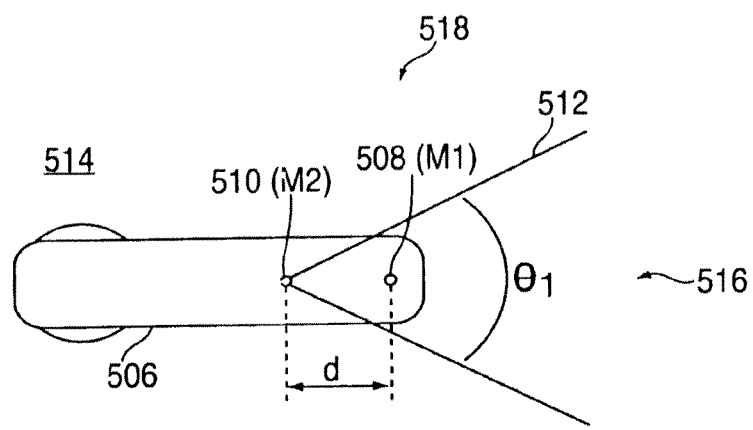

FIG. 5B is an illustrative system 514 that can utilize two microphones and can aid in noise cancellation for wireless headsets in accordance with embodiments of the invention. As shown in FIG. 5B, wireless headset 506 can have two microphones, microphone 508 (M1) and microphone 510 (M2), both of which are omni-directional microphones. As used herein, M1 and M2 are used to define the first and second microphones, respectively, in a two-microphone wireless headset system. As will be discussed below, in other embodiments, the system can utilize three omni-directional microphones. In this case, M1, M2, and M3 are used to define, respectively, the first, second, and third microphones in the three-microphone system.

By utilizing two microphones in system 514, wireless headset 506 can effectively create a directional microphone that can allow system 514 to effectively "hear" audio signals only received from a single direction. For example, as illustrated in FIG. 5B, system 514 has created a virtual "cone" 512 that can extend from M2 at an angle $\theta_1$.

As explained in greater detail below, a "cone" is a descriptive, three-dimensional volume of area that can originate from the wireless headset and then can extend outwards away from the wireless headset. Although cone 512 is shown as originating from M2 in FIG. 5B, a cone can alternatively originate from any point on wireless headset or from any point in the area surrounding a wireless headset. A noise cancellation system can utilize a cone by determining whether an audio signal is received from a direction that is inside of the cone or from a direction that is outside of the cone. For example, in FIG. 5B, any audio signals which are received outside of cone 512 can be discarded by system 514 and filtered out. Likewise, only audio signals which are received inside of cone 512 can be kept by system 514 and, after any necessary processing, can be finally transmitted to a second party. In this manner, if a cone is positioned in a direction that faces a user's mouth, a noise cancellation system can filter out any ambient noise that is received outside of the cone.

In some embodiments, the noise cancellation system can abruptly discard any audio signals which are received outside of a cone. For example, the noise cancellation system can treat the cone as a step function. In this scenario, the noise cancellation system can completely discard audio signals received outside of the cone and can fully keep audio signals received inside of the cone. Alternatively, the noise cancellation can treat the cone as a Gaussian function. In this scenario, audio signals received slightly outside or slightly inside of the cone can still be kept by the system, but can be reduced in importance (i.e., can be reduced in audio intensity, can be weighted to be less important when processed by, for example, a digital signal processor, can be marked as more likely to be ambient noise when processed by a noise cancellation system, etc.). Audio signals received from far outside of the cone can still be completely discarded by the noise cancellation system and audio signals received from the middle of the cone may not be reduced in importance. In some embodiments, the cone can be treated as a combination of a step function and a Gaussian function.

The size and shape of cone 512 can be described by its arc. Likewise, the arc can be defined by a suitable angle $\theta_1$. As used herein, angle $\theta_1$ is used to define the angle of an arc for a noise canceling cone that can be utilized for noise cancellation in a wireless headset. If angle $\theta_1$ is made to be a smaller angle, cone 512 likewise becomes smaller and a greater amount of ambient noise can be filtered out by system 514. Similarly, if angle $\theta_1$ is made to be a larger angle, cone 512 likewise becomes larger and a smaller amount of ambient noise can be filtered out by system 514.

Angle $\theta_1$ can be controlled by system 514 and can potentially have any value. For example, if angle $\theta_1$ is 360 degrees, then system 514 effectively functions as a system containing a single, omni-directional microphone. In this case, similar to system 500, system 514 can hear any audio signals received from any direction and does not utilize directional microphones to perform noise cancellation. If angle $\theta_1$ is an angle less than 360 degrees, then cone 512 can filter out at least a portion of ambient noise, thus enabling system 514 to "hear" an audio signal that contains less ambient noise than system 500. The manner in which system 514 can determine angle $\theta_1$ and create noise canceling cone 512 will be discussed in greater detail in the descriptions and figures to follow.

System 514 can create noise canceling cone 512 in the following manner. M1 and M2 are separated by a known distance, d. When an audio signal is received by the two microphones, M1 can receive the audio signal at a different time than M2. Thus, by measuring the "time of flight" required by an audio signal to reach each of the microphones, and by taking distance d into account, system 514 can determine the direction from which an audio signal was received. For example, if a first audio signal arrives from direction 516, M1 can initially receive the first audio signal. After a time delay $TD_1$, M2 can next receive the first audio signal. In another example scenario, if a second audio signal is received from direction 518, the second audio signal can once again strike M1 first and then, after a time delay $TD_2$, strike M2, where $TD_2 < TD_1$. Thus, by determining a Threshold Time Delay and by measuring the time delay of a particular audio signal, system 514 can discard audio signals with a time delay that is smaller than the Threshold Time Delay. This results in system 514 filtering out audio signals that arrive from outside of cone 512, where cone 512 is defined by angle $\theta_1$. Angle $\theta_1$ is inversely related to the Threshold Time Delay. The smaller the Threshold Time Delay becomes, the larger angle $\theta_1$ becomes. The larger angle $\theta_1$ becomes, the larger cone 512 grows, thus resulting in a smaller amount of ambient noise that can be filtered out by system 514.

In an alternative embodiment, the direction from which an audio signal is received can be determined by audio signal intensity, instead of by time delays. For example, M1 and M2 can receive the same audio signal at different intensities, depending on the direction from which the audio signal arrives. Thus, in a manner which is analogous to the method above that utilizes the time delay between M1 and M2 and taking distance d and cone 512 into account, the difference in intensities of an audio signal received by M1 and M2 can be used to filter out ambient noise. Alternatively, a combination of a system that measures time delays and a system that measures audio signal intensities can be utilized.

Additionally, although cone 512 is illustrated in FIG. 5B as originating from M2, in other embodiments cone 512 could originate from other, various sources. For example, cone 512 can originate from M1. The origin and size of cone 512 can be calculated and/or determined by, for example, processor 310 or digital signal processor 306 of FIG. 3.

The value of angle $\theta_1$ (or, alternatively, the value of the Threshold Time Delay), and thus the size of cone 512, can be determined and/or optimized by system 514 through several methods. In one embodiment, the angular position of a wireless headset can be used to determine a suitable value for angle $\theta_1$.

Figure 6A:
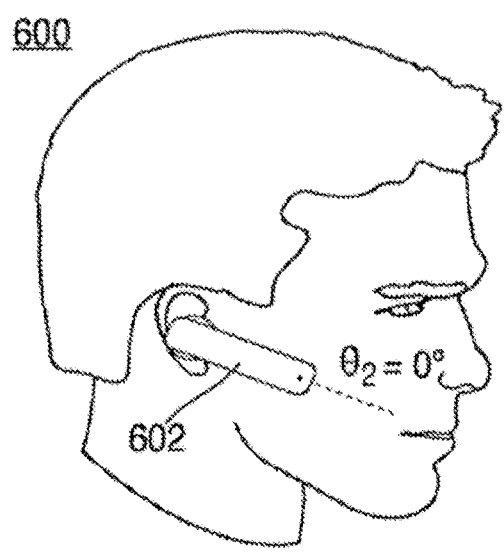
FIGS. 6A-6C illustrate various configurations in which a person can utilize a system in accordance with some embodiments of the present invention.

For example, FIG. 6A shows system 600 in which a user is wearing wireless headset 602 in a particular position. In this scenario, wireless headset 602 is pointing directly toward the user's mouth and is making an angle $\theta_2$=0 degrees with the user's mouth, As used herein, angle $\theta_2$ is used to define the angle that a wireless headset makes with a line leading from the headset's earbud to the user's mouth, and thus can be used to define the position of a wireless headset. Since wireless headset 602 is pointing directly towards the user's mouth, a relatively small cone could sufficiently capture the user's voice. Thus, system 600 can potentially set angle $\theta_1$ to be very small (e.g., angle $\theta_1$ could be between 5 and 25 degrees). Therefore, in the scenario illustrated by FIG. 6A, a relatively small cone could be generated which can filter out a substantial amount of ambient noise and yet can still sufficiently capture all or most of the users voice.

Figure 6B:
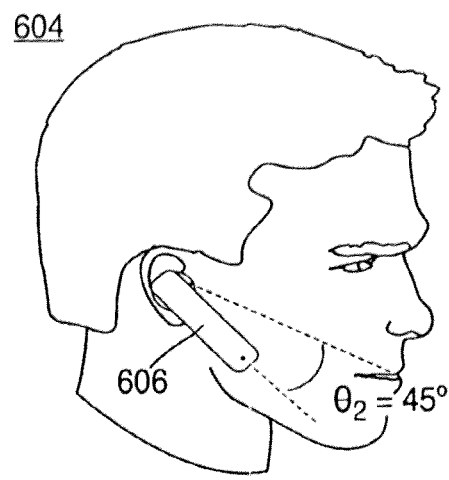

In FIG. 6B, system 604, in which wireless headset 606 is positioned at an angle $\theta_2$=45 degrees with the user's mouth, is illustrated. Since wireless headset 606 is no longer pointing directly at the user's mouth, in order to substantially capture the user's voice, a larger cone must be generated. For example, in the scenario illustrated by FIG. 6B, system 604 could potentially generate a cone with angle $\theta_1$ being between 90 and 120 degrees. System 604 can thus potentially capture the user's voice and still filter out a portion of ambient noise. However, since the cone generated by system 604 is larger than the cone generated by system 602, system 604 could typically not filter out as much ambient noise as system 602.

Figure 6C:
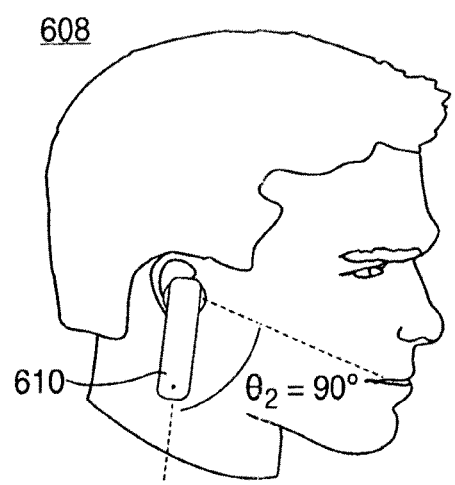

In FIG. 6C, system 608 is illustrated in which wireless headset 610 is positioned at an angle $\theta_2$=90 degrees with the user's mouth. In this case, angle $\theta_1$ would need to be relatively large in order to create a cone that could include the user's mouth and substantially capture the user's voice. In some embodiments, when angle $\theta_2$ becomes larger than a predetermined threshold value, rather than generating a substantially large cone, the system could optionally turn off one of the two microphones and utilize a single, omni-directional microphone system. This can allow the system to save power by only utilizing one microphone when a two-microphone system is unable to create a cone that is small enough to filter out a satisfactory amount of ambient noise. In this case, the system can weigh the benefits of power conservation versus noise cancellation to determine if or when it can be beneficial to switch the system to a single, omni-directional microphone system. Alternatively, the user can be allowed to manually calibrate the system and determine the threshold value of angle $\theta_2$ at which the system switches to a single, omni-directional microphone system.

Figure 7:
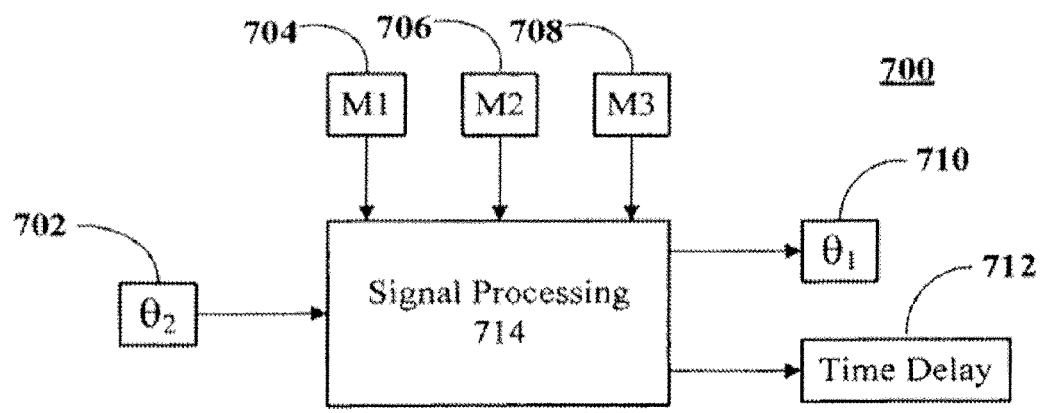
FIGS. 7-8 are simplified input/output diagrams of systems in accordance with some embodiments of the present invention.

FIG. 7 shows a simplified system 700 that can determine angle $\theta_1$ and generate a noise canceling cone. As mentioned above, a system could alternatively calculate a Threshold Time Delay and use this value to generate a noise canceling cone. As another example, a system could alternatively measure the audio signal intensity at each microphone and use this value to generate a noise canceling cone. As used herein, when angle $\theta_1$ is discussed, one skilled in the art can appreciate that analogous systems and methods could be created that alternatively or additionally utilize a Threshold Time Delay in place of angle $\theta_1$.

System 700 can include four inputs, input 702 (angle $\theta_2$), input 704 (M1), input 706 (M2), and input 708 (M3), and can include two outputs, output 710 (angle $\theta_1$), and time delay 712. System 700 can perform signal processing 714 on one or more of inputs 702, 704, 706, and 708. One skilled in the art can appreciate that, in some embodiments, the functionality of certain input and/or output components can be combined or omitted and that additional or less components, which are not shown in FIG. 7, can be included in system 700. For example, although input signals from three microphones are shown in FIG. 7 (M1, M2, and M3), a two-microphone system (i.e., as illustrated by FIG. 5B), can operate with only M1 and M2 present. Alternatively, another embodiment of the present invention could operate with input signals from more than three microphones.

In a preferred embodiment, an accelerometer can be used to determine the input angle $\theta_2$. Input 704 and input 706 can be input signals from microphone 508 and microphone 510 of FIG. 5B, respectively. As mentioned above, a two-microphone system could require only two microphones and may not require input 708 (M3). However, some systems could utilize a third microphone in order to create a system that can potentially cancel a greater amount of ambient noise, In this scenario, input 708 could be, for example, an input signal from microphone 1006 of FIG. 10. Systems that can utilize three microphones ill be discussed in greater detail in the descriptions and figures to follow.

The outputs of system 700 can include output 710 (angle $\theta_1$), which defines the noise canceling cone, and time delay 712. In a two-microphone system, time delay 712 can be, for example, the time delay between input 704 (M1) and input 706 (M2). In a three-microphone system, the value of time delay 712 can vary based on the value of angle $\theta_2$. For example, time delay 712 can be the time delay between input 704 (M1) and input 706 (M2), the time delay between input 706 (M2) and input 708 (M3), or the time delay between input 704 (M1) and input 708 (M3). Methods for determining the time delay for a three-microphone system will be discussed in greater detail in the descriptions and figures to follow. Alternatively or additionally, as mentioned above, rather then a time delay between two microphone input signals, system 700 could optionally output the intensity difference between two microphones.

When angle $\theta_1$ (or, for example, time delay 712 or an output corresponding to the intensity difference) is determined, this value can then be utilized to cancel audio signals received outside of the noise canceling cone that is defined by angle $\theta_1$. Thus, at least a portion of ambient noise can be cancelled by system 700. For example, based on the distance d between two microphones (i.e., distance d of FIG. 5B), a processor can determine if an audio signal represented by time delay 712 has been received from outside the cone defined by angle $\theta_1$. If the audio signal was received inside the cone, that audio signal can be kept for further processing. Otherwise, if the audio signal was received outside of the cone, this audio signal can be discarded and removed from the audio signal that is sent to a second party.

Figure 8:
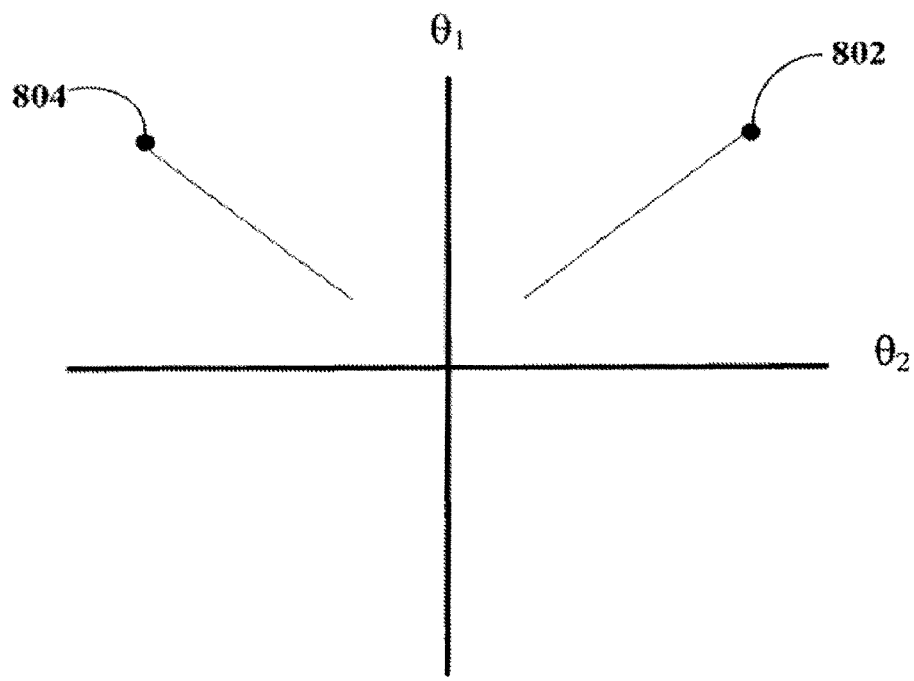

FIG. 8 shows a graph illustrating the relationship between the input angle $\theta_2$, which describes the position of a wireless headset, and the output angle $\theta_1$, which defines the size of the noise canceling cone. Note that no specific values are labeled on this graph, and this illustration is not meant to be limiting in any way. Rather, this graph simply illustrates the basic relationship that can exist in some embodiments of the present invention between angle $\theta_1$ and angle $\theta_2$. As can be seen from this graph, as angle $\theta_2$ becomes larger in value, angle $\theta_1$ likewise can become larger in value. In other words, as the wireless headset moves away from the user's mouth, the noise canceling cone can become larger in size. In a preferred embodiment, the noise canceling cone will increase in a manner which can allow the cone to receive most or all of the user's voice while canceling the greatest amount of ambient noise possible. Also, this graph can be mirrored along the negative x-axis. For example, FIGS. 6A-6C show angle $\theta_2$ increasing in value as the wireless headset moves away from the user's mouth in a clockwise direction. If angle $\theta_2$ is defined to increase in negative value as the wireless headset moves away from the user's mouth in a counter-clockwise direction, then angle $\theta_1$ can generally increase in value as angle $\theta_2$ increases in negative value.

FIG. 8 also illustrates two breakpoints, breakpoint 802 and breakpoint 804, which may or may not occur at the same absolute values of angle $\theta_1$ and/or angle $\theta_2$. As angle $\theta_2$ increases in absolute value, at a particular value, illustrated by breakpoints 802 and 804, it can be beneficial to stop increasing the size of the noise canceling cone. Instead, at breakpoint 802 and/or 804, the system can turn off all but one microphone and operate as a single, omni-directional microphone system. This results in the wireless headset functioning as a system that does not utilize a directional microphone with a noise canceling cone. One potential benefit of switching to only a single microphone can be to save power. As the cone increases in size, the noise cane ling benefits of a two or more microphone system can become less apparent. At some point, the cone may increase to a large enough size that the noise canceling benefits of the cone are not great enough to justify the additional power usage of a two-microphone system. Thus, at this point, h is illustrated by breakpoints 802 and 804, the system can switch to a single microphone. The values of breakpoints 802 and 804 can be automatically determined by the system, or can alternatively be manually configured by a user. In some embodiments, the values of breakpoints 802 and 804 can be dynamic and could change based on factors such as, for example, the amount of existing ambient noise, time of day, available power supply of the wireless headset, power supply of a user device in communication with the wireless headset (for example, telephone 102, etc.), priority level of a telephone call, etc.

Figure 9:
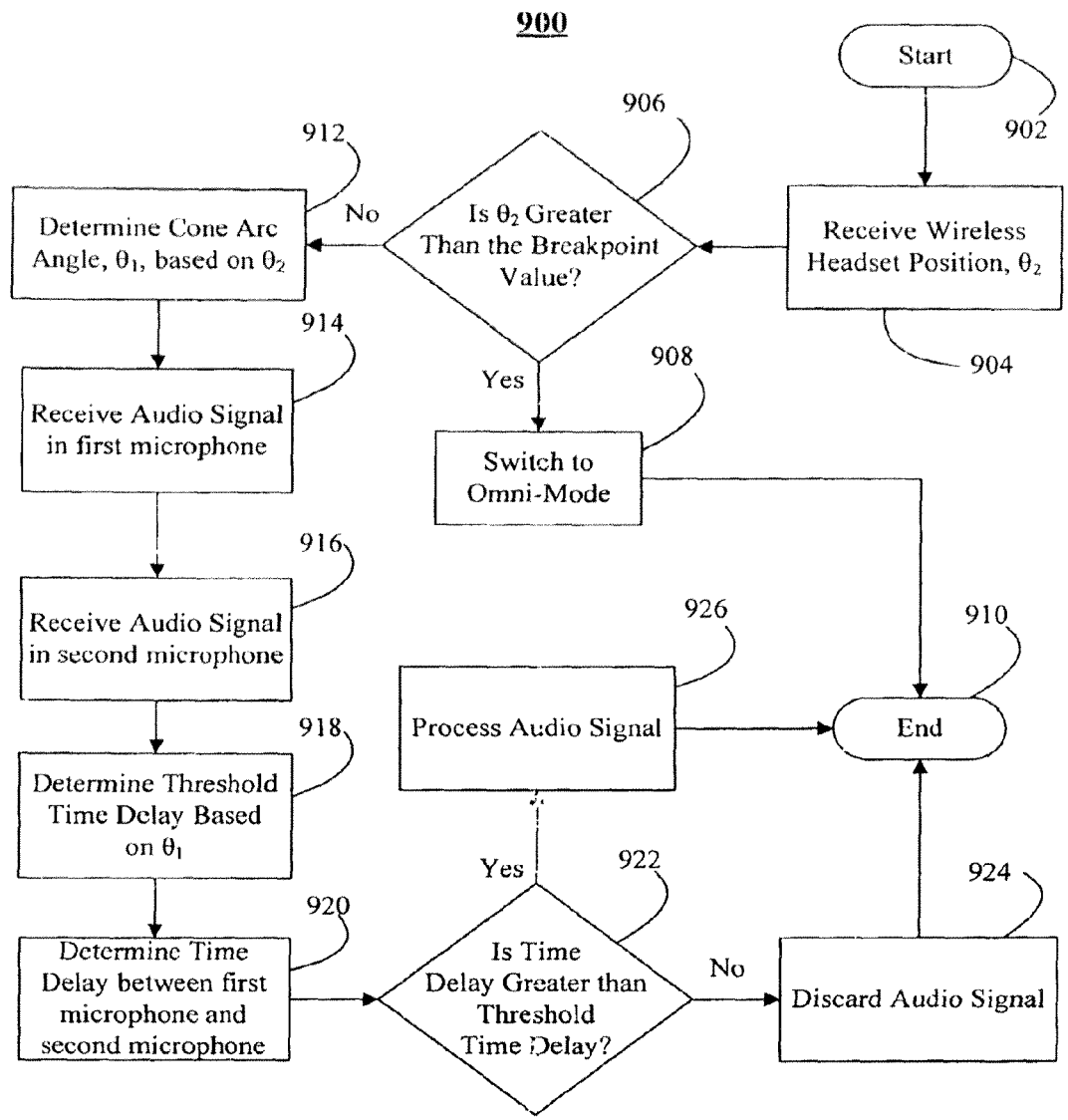
FIG. 9 is a simplified logical flow chart of an illustrative mode of operation of a two-microphone system in accordance with some embodiments of the present invention.

FIG. 9 is an illustrative flow chart for process 900, which represents one embodiment of the present invention for performing noise cancellation with a two-microphone system. The processes discussed here and in the processes to follow are intended to be illustrative and not limiting. Persons skilled in the art can appreciate that steps of the processes discussed herein can be omitted, modified, combined, and/or rearranged, and any additional steps can be performed without departing from the scope of the invention.

Process 900 can begin at step 902 and proceed to step 904. In step 904, process 900 can receive the wireless headset's position, as defined by angle $\theta_2$. Angle $\theta_2$ could be received, for example, from input/output circuitry 314. In particular, in one embodiment on the present invention, an accelerometer can determine angle $\theta_2$ and process 900 can then receive this information from the accelerometer. Any processing of the signal that is received by the accelerometer, or any processing that takes place in process 900 in general, can be performed by components such as, for example, digital signal processor (DSP) 306 or processor 310. One skilled in the art can appreciate that DSP 306, processor 310, or any power supplies utilized by these components can be located in various devices. For example, one or more of DSP 306, processor 310, or power supplies could be located in a wireless headset, cellular telephone in communication with the wireless headset, computer system in communication with the wireless headset, telephone system in communication with the wireless headset, or any combination of the above. One advantage of utilizing, for example, DSP 306 or processor 310, in a device which is not the wireless headset, could be potential power saving benefits. This benefit could be particularly useful since wireless headsets tend to have a relatively small battery and/or power supply.

In step 906, process 900 can determine if angle $\theta_2$ is greater than the breakpoint value, for example, greater than breakpoint 802 of FIG. 8. If the system is taking negative values of angle $\theta_2$ into account, then the system could determine if the absolute value of the negative angle $\theta_2$ is greater than the absolute value of the negative breakpoint value, for example, breakpoint 804 of FIG. 8.

In response to response to angle $\theta_2$ being greater then the breakpoint value, process 900 can proceed to step 908 and switch to Omni-Mode. In omni-mode, only one of the microphones is utilized and the system functions as a single, omni-directional microphone system without a noise canceling cone. A benefit of switching to Omni-Mode can be to aid in preserving power supplies. As mentioned above, the value of the breakpoint can be configured by the system, manually configured by the user, or can dynamically change. Alternatively, steps 906 and 908 could be omitted and the system can simply never switch to Omni-Mode. This omission also could, for example, be determined by the system or configured by a user.

Process 900 can terminate at step 910. Process 900 can terminate, for example, when the wireless headset is no longer in communication with a second party, when a telephone call has ended, when the noise cancellation system has been turned off, or when any other suitable event occurs.

In response to angle $\theta_2$ not being greater than the breakpoint, process 900 can proceed to step 912 and operate as a two-microphone system. In step 912, process 900 can determine the angle $\theta_1$, which defines the size of the noise canceling cone. Although the steps in process 900 are illustrated as single steps that proceed one after the other, some or all of the steps could alternatively operate continuously. For example, the system could continuously or periodically monitor angle $\theta_2$ and, as angle $\theta_2$ changes, continuously update angle $\theta_1$ and/or switch back and forth between Omni-Mode and a mode with a noise canceling cone. For example, if the user is touching or moving the wireless headset, and/or if the wireless headset is slipping and changing position on its own, process 900 can automatically update the Omni-Mode status and/or angle $\theta_1$ in real-time.

In step 914, the first microphone (for example, M1 of FIG. 5B) can receive an audio signal. In step 916, the second microphone (for example, M2 of FIG. 5B) can receive the same audio signal. Although step 916 is illustrated as occurring after step 914, depending on the direction from which the audio signal arrives, M2 can potentially receive the audio signal prior to M1 receiving the audio signal.

In step 918, process 900 can use angle $\theta_1$ to determine the Threshold Time Delay. As mentioned above, the Threshold Time Delay can be used to determine which audio signals arc outside of the noise canceling cone and can thus be discarded by the system. Alternatively, the Threshold Time Delay can be determined directly from angle $\theta_2$ and step 912 can be omitted.

In step 920 the Time Delay between the M1 and M2 can be determined. For example, this value can be the time that it takes for an audio signal which has just reached M1 to next reach M2. As mentioned above, the audio signal can potentially reach M2 first. In this case, the Time Delay can be, for example, the time required for an audio signal which has reached M2 to next reach M1.

In step 922, process 900 can determine if the Time Delay is greater than the Threshold Time Delay. If the Time Delay is less than the Threshold Time Delay, the audio signal has arrived outside of the noise canceling cone and can be considered ambient noise. In this case, process 900 can proceed to step 924 and discard the audio signal. In response to the Time Delay being greater than the Threshold Time Delay, the process can proceed to step 926. In step 926, the audio signal can be processed in any suitable manner. For example, the system can perform digital signal processing on the audio signal, transmit the audio signal to a second party's user device, transmit the audio signal to a cellular telephone in communication with the wireless headset, transmit the audio signal to any other device in communication with the wireless headset, etc.

Figure 10:
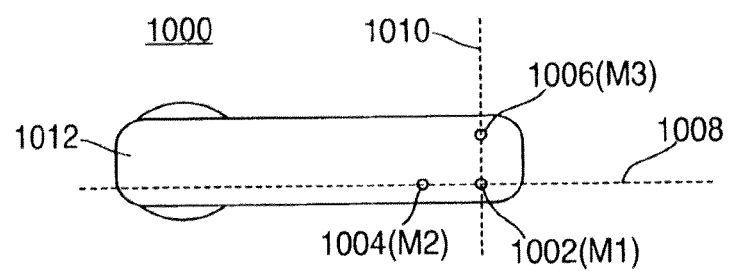
FIGS. 10-11D illustrate a three-microphone system in accordance with some embodiments of the present invention.

As mentioned above, a system utilizing three microphones can be created that can provide added directionality and can potentially provide more noise cancellation than a two-microphone system. FIG. 10 shows system 1000 that illustrates one embodiment of a system utilizing three microphones.

System 1000 can include three microphones, microphone 1002 (M1), microphone 1004 (M2), and microphone 1006 (M3). As mentioned above, as used herein when discussing a three-microphone system, M1, M2, and M3 are used to define the first, second, and third microphones, respectively, of the system. In one embodiment of system 1000, M1 and M2 can be located on axis 1008, and M2 and M3 can be located on a different axis, axis 1010. As illustrated in the descriptions to follow and in FIGS. 11A-11D, depending on the position of the wireless headset 1012, different combinations of positions for M1, M2, and M3 can be used to create a noise canceling cone that has a particular directionality. The noise canceling cone can be created in a manner that maximizes the ambient noise that can be canceled by system 1000. Although axis 1008 and axis 1010 are illustrated as being perpendicular to one another and particular positions for M1, M2, and M3 are shown, FIG. 10 is meant to be illustrative of one embodiment of the present invention and is not limiting. Moreover, one skilled in the art can appreciate that various configurations, combinations, and positions for M1, M2, and M3 can be utilized without departing from the present invention.

FIGS. 11A-11D show different modes of operation that can be used for one embodiment of a particular configuration of M1, M2, and M3. As used herein, the modes of a wireless headset are defined to be a combination of one or more microphones that can be used to create a noise canceling cone. For example, one mode could use M1 and M2 to create a noise canceling cone, another mode could use M2 and M3 to create a noise canceling cone, and another mode could use a single microphone that operates as an omni-directional microphone, (i.e., a noise canceling cone with $\theta_1 = 360$ degrees), etc.

Figure 11A:
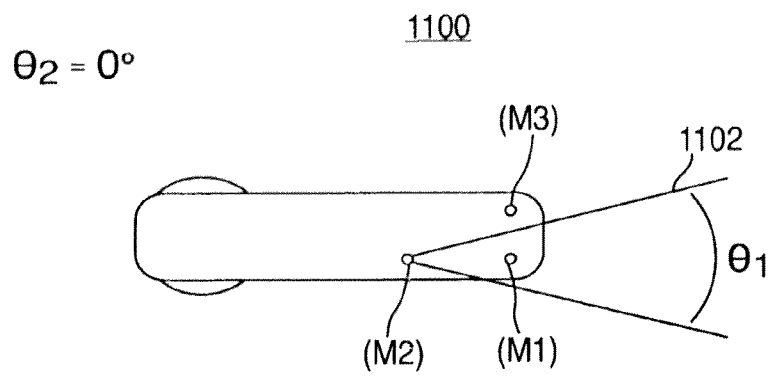

FIG. 11A shows a wireless headset using mode 1100. In this illustration, $\theta_2 = 0$ degrees or, in other words, the wireless headset is facing towards the user's mouth. In this case, M1 and M2 can be used to create cone 1102 that is directed towards the user's mouth. M3 can be turned off. Since cone 1102 is pointing towards the user's mouth, angle $\theta_1$ can potentially be small in value, thus creating a relatively small cone 1102 that can filter out a substantial amount of ambient noise.

Figure 11B:
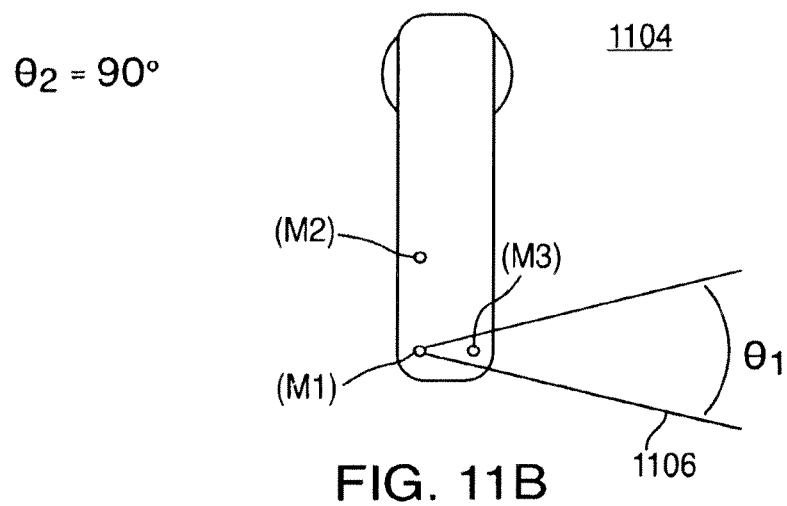

FIG. 11B shows mode 1104 for a three-microphone system. In this scenario, the wireless headset is in a position where $\theta_2 = 90$ degrees. In a two-microphone system, the wireless headset would include only M1 and M2 and can either create a substantially large cone in order to capture the user's voice (and would also capture a large amount of ambient noise) or can turn off one microphone in order to operate as a single, omni-directional microphone system. In mode 1102, M1 and M3 are used to create a noise canceling cone and M2 can be turned off. Since M1 and M3 can be used to create a cone 1106 that is pointing toward the user's mouth, angle $\theta_1$ can again be potentially small in value. Thus, even though the wireless headset itself is not pointing towards the user's mouth, mode 1104 can still create cone 1106 that is pointed towards the user's mouth, can be relatively small in value, and thus can potentially filter out a substantial amount of ambient noise.

Figure 11C:
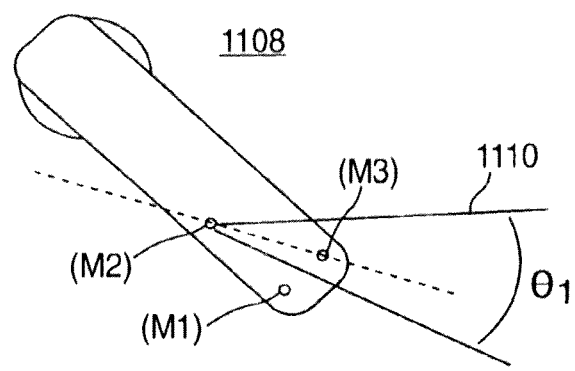

FIG. 11C shows mode 1108. Once again, two microphones can be chosen that can create a noise canceling cone that is directed towards the user's mouth. In this case, the wireless headset is position at angle $\theta_2 = 45$ degrees and M2 and are used to create cone 1110. M1 can be turned off.

Figure 11D:
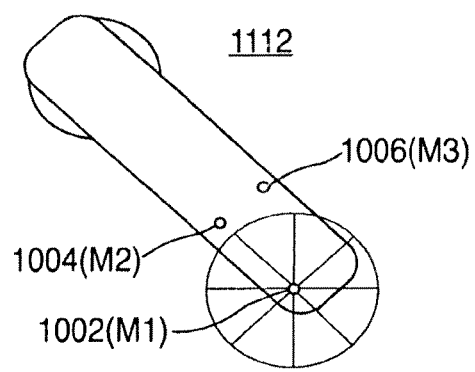

FIGS. 11A-11C illustrate cases where a combination of two of M1, M2, and M3 can create a cone that is substantially directed towards the user's mouth. In some cases, the position of the wireless headset, as defined by angle $\theta_2$, and the configuration of M1, M2, and M3 may be such that a cone cannot be created that is suitably directed towards the user's mouth. In this case, rather than creating a noise canceling cone that is relatively large in order to capture the user's voice, the system can turn on only one microphone. For example, as illustrated in FIG. 11D, M2 and M3 can be turned off and M1 can be turned on. Thus, in mode 1112, the system operates as a single, omni-directional microphone system. Furthermore, due to the close proximity of M1, M2, and M3, when operating as a single omni-directional microphone, one microphone does not typically yield significantly better performance than the other microphones. Thus, one skilled in the art can appreciate that M2 or M3 can alternatively be used as the single, omni-directional microphone which is not turned off. One benefit of turning on only one microphone in this scenario can be to save power when the system cannot create a sufficiently small noise canceling cone.

As illustrated by FIGS. 11A-11D, by using a particular combination of varying microphones, a three-microphone system can create a noise canceling cone of varying directionality. The directionality of the cone can allow a three-microphone system, such as system 1000 of FIG. 10, to generate a cone that can be smaller in size than a cone used by a two-microphone system, such as system 514 of FIG. 5B. Thus, a three-microphone system can be used instead of a two-microphone system to more optimally remove ambient noise. By the same reasoning, a system with more than three microphones can be used to create further directionality for the cone and may thus cancel ambient noise more effectively than systems with a fewer number of microphones.

Additionally, a system with two or more microphones can change modes in real time. For example, the angle $\theta_2$ (position) of a wireless headset can change as a user is using the wireless headset. For example, a user could be adjusting the position of a wireless headset, the wireless headset may get bumped and moved, or the wireless headset may simply be slipping downwards as time passes. In this case, the wireless headset can change modes in real time as the wireless headset moves. For example, in one embodiment, as a wireless headset slips downwards and away from the user's mouth, the wireless headset could change from mode 1100 to mode 1104 to mode 1108. Alternatively, as another example, the wireless headset could switch from mode 1100 to mode 1112 to mode 1108, etc.

In addition to turning off all but one microphone in response to the position of the wireless headset (for example, when angle $\theta_2$ passes breakpoint 802 of FIG. 8), the system could additionally switch to a single, omni-directional microphone system for other reasons. For example, since directional microphones tend to perform poorly in a windy environment, the system can be configured to switch to a single microphone if a substantial amount of wind noise is present. The noise due to wind is typically attributed to the turbulence which occurs in the microphone ports. Since this noise is random, if more than one microphone is present, the noise from multiple microphones can add to each other, rather than cancel each other. Thus, in a windy environment, a directional microphone may actually generate more noise than a single microphone system. Switching to a single microphone system in a windy environment can not only reduce noise, but can also save power for the system.

As mentioned above, a system can switch to a single microphone system in order to save power. The need for saving power in a wireless headset is especially apparent since wireless headsets tend to have a relatively short battery life. Thus, although there is a need to provide noise canceling in a wireless headset, there is also a need to conserve power in the wireless headset. In some embodiments of the present invention, a balance can be determined between the noise canceling and power management of the wireless headset. In other words, the system can determine when the noise canceling benefits are great enough to justify the extra power usage of the noise cancellation system, and when the noise canceling should be modified or turned off in order to conserve power.

In some embodiments, the system can save power by changing to a single-microphone system or by turning off at least part of a noise cancellation system when battery power (e.g., battery power in the wireless headset and/or in a device, such a cellular telephone, in communication with the wireless headset) is sufficiently low. The decision to save power when battery power is running low can be determined regardless of other factors (e.g., regardless of the amount of ambient noise, at least a part of the noise cancellation system is turned off if battery power is low). Alternatively, low battery power can be another factor to take into account when determining if a noise cancellation system should be turned on or turned off. In other embodiments of the present invention, there can be a system which can not only cancel noise, but at the same time can also conserve power for the wireless headset.

In some embodiments of the present invention, a user can manually control when a noise cancellation system is turned on and when the noise cancellation system is turned off. Thus, the user can personally decide whether he or she thinks there is enough ambient noise present to justify the extra power usage required by a noise cancellation system. As another example, if the user feels that the current telephone conversation is important and they want to ensure that their voice is heard, then the user may once again choose to turn on the noise cancellation system. Although noise cancellation systems discussed so far have been related to systems with directional microphones, one skilled in the art can appreciate that power management is not limited to a single type of noise cancellation. For example, when a user manually controls when a noise cancellation system is turned on or turned off, the user is not limited to controlling a noise cancellation system which is associated with directional microphones. Rather, the user can manually control any type of noise cancellation system that is suitable for a wireless headset.

In other embodiments, a digital signal processor (DSP), such as, for example, digital signal processor 306 of FIG. 3, can help with power management. The DSP can monitor the ambient noise that is present. If the DSP determines that there is a low level of ambient noise, all but one microphone can be turned off, and the wireless headset can operate with a single, omni-directional microphone. If, on the other hand, the DSP determines that the level of ambient noise is high, two or more microphones can be used to create a directional microphone with a noise canceling cone. Once again, however, this embodiment is not limited to managing power for noise cancellation systems that employ directional microphones, but can be applied to any type of noise cancellation system that is suitable for a wireless headset.

In one embodiment, there can be an ambient noise Cutoff Value. If the DSP determines that the level of ambient noise is above the Cutoff Value, the noise cancellation system can be turned on. Likewise, if the level of ambient noise is below the Cutoff Value, the noise cancellation system can be turned off. The Cutoff Value can, for example, be a default system value, manually set by a user, or a dynamic value that changes based on various factors. For example, the Cutoff Value can change based on the power level in the wireless headset, the importance level of a telephone call, etc. Depending on the amount of power which can be allocated for the DSP to use, the DSP can periodically sample an audio signal to determine the ambient noise level or can continuously sample an audio signal. Any time the DSP determines that the level of ambient noise has risen above or dropped below the Cutoff Value, the noise cancellation system can be turned on or off, respectively. A DSP that continuously samples an audio signal can be more precise than a DSP that periodically samples an audio signal, although continuous sampling can quire a greater amount of power.

Utilizing a DSP to determine when a noise cancellation system can be turned on or off can save more power than simply allowing a noise cancellation system to always be turned on. However, the wireless headset can still use a substantial amount of battery life to power the digital signal processor. Thus, in some embodiments of the present invention, it can be beneficial to have at least part of the digital signal processing (or any necessary processing) done in a handset (e.g., telephone 102 of FIG. 1) that is in communication with the wireless headset. Since a handset can have a larger power supply than a wireless headset, a DSP can continuously sample ambient noise without affecting the battery supply as greatly as a wireless headset's battery supply could be affected. As one example, a wireless headset that runs a DSP for 5 minutes might expend around 25% of the battery supply. On the other hand, a handset that runs the same DSP for 5 minutes might consume about 1% of the handset's battery supply. Thus, using a handset to perform at least part of the digital signal processing for a wireless headset can result in a substantial amount of power savings for the wireless headset, without greatly impacting the power supply of the handset.

The DSP in the handset can sample an audio signal to determine the amount of ambient noise present in the audio signal. When the DSP determines that the ambient noise has risen too high or dropped too low, the handset can send instructions to the wireless headset to turn on or turn off the noise cancellation system. Once again, the handset's DSP can utilize a Cutoff Value to determine when a noise cancellation system can be turned on or off. In this manner, the handset can perform some or all of the computations and data processing, thus using the handset's own, larger power supply for these procedures. Then, based on the results of the computations and data processing, the handset can send appropriate instructions to the wireless headset. For example, in one embodiment, the handset can send a message on a Bluetooth™ side channel to the wireless headset with instructions to either turn on or turn off a noise cancellation system.

Figure 12:
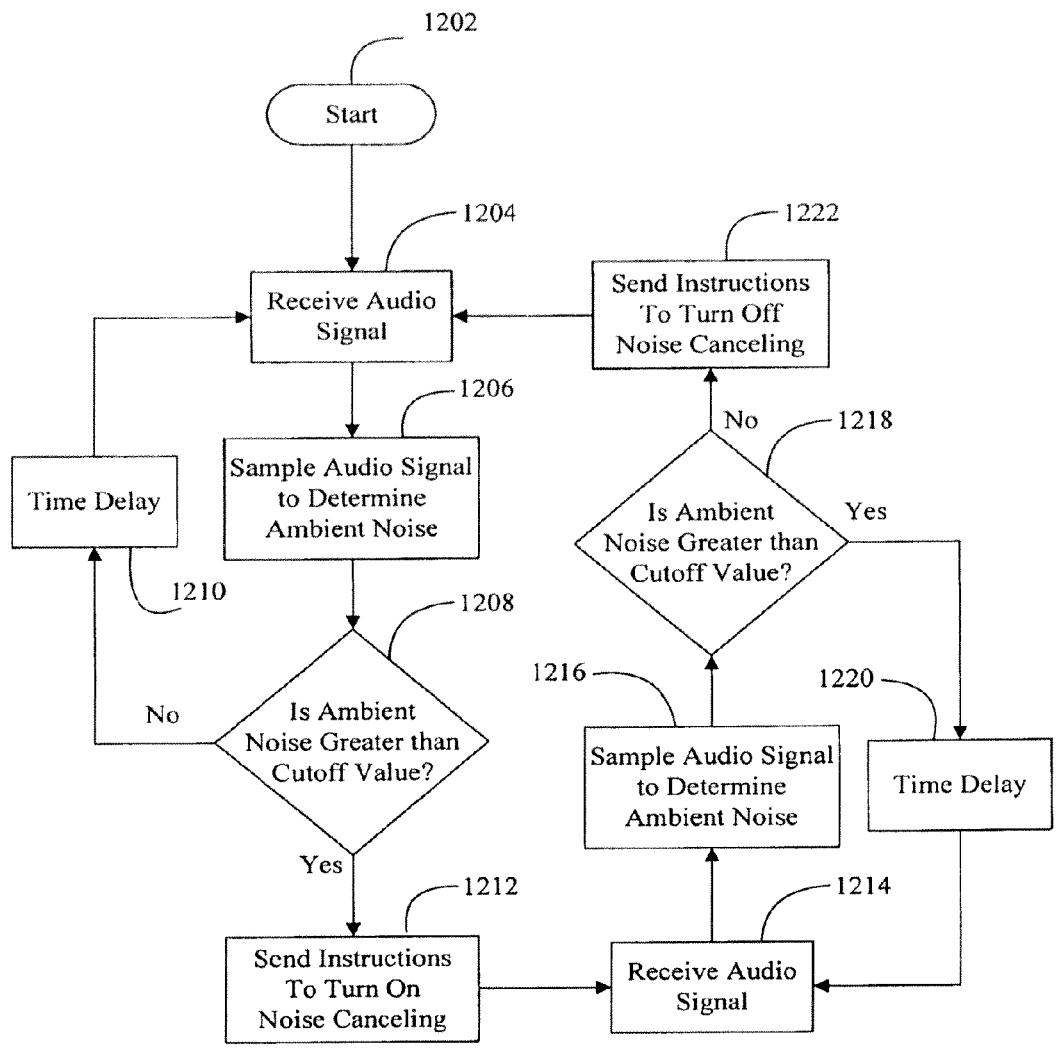
FIG. 12 is a simplified logical flow chart of an illustrative mode of operation in accordance with some embodiments of the present invention.

FIG. 12 is an illustrative flow chart for process 1200 which represents one embodiment for a digital signal processor which determines when to turn on or turn off a noise canceling system. The processes discussed here and in the processes to follow are intended to be illustrative and not limiting. Persons skilled in the art can appreciate that steps of the processes discussed herein can be omitted, modified, combined, and/or rearranged, and any additional steps can be performed without departing from the scope of the invention.

Process 1200 can start at step 1202 and proceed to step 1204. In step 1204, an audio signal can be received. The audio signal can be received, for example, by one or more microphones in a wireless headset. If a handset in communication with the wireless headset is performing the digital signal processing of the audio signal, then the audio signal can be first received by wireless headset and then sent to the handset for subsequent processing. The audio signal can contain not only a user's voice, but any ambient noise that is present as well.

In step 1206, the audio signal can be sampled by, for example, a DSP such as digital signal processor 306 of FIG. 3, in order to determine the level of ambient noise that is present. Any suitable form of noise sampling or noise analysis can be performed in order to determine the amount of ambient noise present. As one example, the DSP can analyze the frequency spectrum of the audio signal that is received in step 1204 in order to determine the amount of ambient noise present in the audio signal.

In step 1208, process 1200 can compare the amount of ambient noise to the ambient noise Cutoff Value. As described above, the Cutoff Value can be a default system value that is determined by, for example, the system distributor or manufacturer. Alternatively, a user can manually set a Cutoff Value for process 1200. In yet another embodiment, the Cutoff value can be a dynamic value which changes based on factors such as the power supply of the wireless headset, a handset in communication with the wireless headset, the ratio of a user's voice to the ambient noise, the importance level of the telephone call, etc.

In response to the ambient noise not being greater than the Cutoff Value, the system can proceed to step 1210. In step 1210, process 1200 can wait for a pre-determined time delay. After the time delay, process 1200 can return to step 1204 and once again receive an audio signal. Thus, process 1200 can repeatedly loop through steps 1204, 1206, 1208, and 1210 and sample the audio signal until the ambient noise is greater than the Cutoff Value. The value of the time delay in step 1210 will determine the frequency at which process 1200 samples the audio signal. Alternatively, if it is desired to continuously sample the audio signal, step 1210 can be removed.

In response to the ambient noise being greater than the Cutoff Value, process 1200 can proceed to step 1212 and send instructions to turn on the noise canceling system. For example, if the data processing is being done in a handset, the instructions can be sent to a wireless headset that is in communication with the handset. Alternatively, if the data processing is being done in the wireless headset itself, the instructions can simply be sent to the appropriate noise canceling system located within the wireless headset.

After the noise canceling has been turned on, process 1200 can proceed to step 1214 and can once again sample the audio signal. Steps 1214, 1216, 1218, and 1220 can operate in the same manner as steps 1204, 1206, 1208, and 1210 except, since the noise canceling system is already on, the steps can continue to loop and repeat as long as the level of ambient noise is greater than the Cutoff Value. For example, in step 1214 an audio signal can be received. In step 1216, this audio signal can be sampled to determine the level of ambient noise present in the audio signal. In step 1218, process 1200 can determine if the ambient noise is greater than the Cutoff Value. In response to the ambient noise being greater than the Cutoff Value, process 1200 can proceed to step 1220 and wait for a pre-determined time delay, and can then return to step 1214. Thus, as long as a received audio signal contains ambient noise that is greater than the Cutoff Value, steps 1214, 1216, 1218, and 1220 can continue to loop and the noise canceling system can remain turned on. In response to the ambient noise level being less than the Cutoff value in step 1218, process 1200 can proceed to step 1222 and send instructions to turn off the noise canceling system.

Process 1200 can then return to step 1204 and once again repeat steps 1204, 1206, 1208, and 1210 until the ambient noise levels rises above the Cutoff Value. In this manner, process 1200 can continuously monitor the amount of ambient noise and suitably turn off or turn on a noise canceling system. Process 1200 can continue to operate as long as the system is on. For example, process 1200 can continue to operate until a wireless headset is no longer in communication with a handset, until a wireless headset is no longer in communication with a second party (until the telephone conversation is over), until the wireless headset is turned off, until a user manually turns off process 1200, etc. Additionally, one skilled in the art can appreciate that the Cutoff Value in step 1208 and the Cutoff Value in step 1218 are not required to be the same value, and that different cutoff values can be used to determine when a noise canceling system is turned on and when it is turned off.

In addition to using an accelerometer to determine the position of a wireless headset, as defined by angle $\theta_2$, an accelerometer can also be used for power management of a wireless headset. In one embodiment, an accelerometer can be used to sense the movement of the wireless headset. This information can then be sent to a processor which can provide the system with appropriate instructions, For example, if a wireless headset is placed on a table and is not in use, no movement will be present. Thus, an accelerometer can monitor the movement of the wireless headset and, if the accelerometer does not sense movement for a predetermined amount of time, the processor can use this information to instruct the wireless headset to turn off the noise canceling system. Alternatively, the processor can instruct the entire wireless headset to turn off. As yet another alternative, the processor can instruct every system of the wireless headset apart from the accelerometer and its relevant components to turn off. The wireless headset or noise cancellation system can stay turned off until, for example, a user manually turns the system back on. As another example, when the system is turned off, the accelerometer can periodically wake up and check for movement. When the accelerometer senses movement again, the processor can instruct the wireless headset or noise cancellation system to once again turn on. User controlled settings can also be used to determined whether or not the accelerometer can control turning the system on or off. In another embodiment, user controlled settings can be used to determined the frequency at which the accelerometer checks for movement, or whether the accelerometer is continuously checking for movement.

Figure 13A:
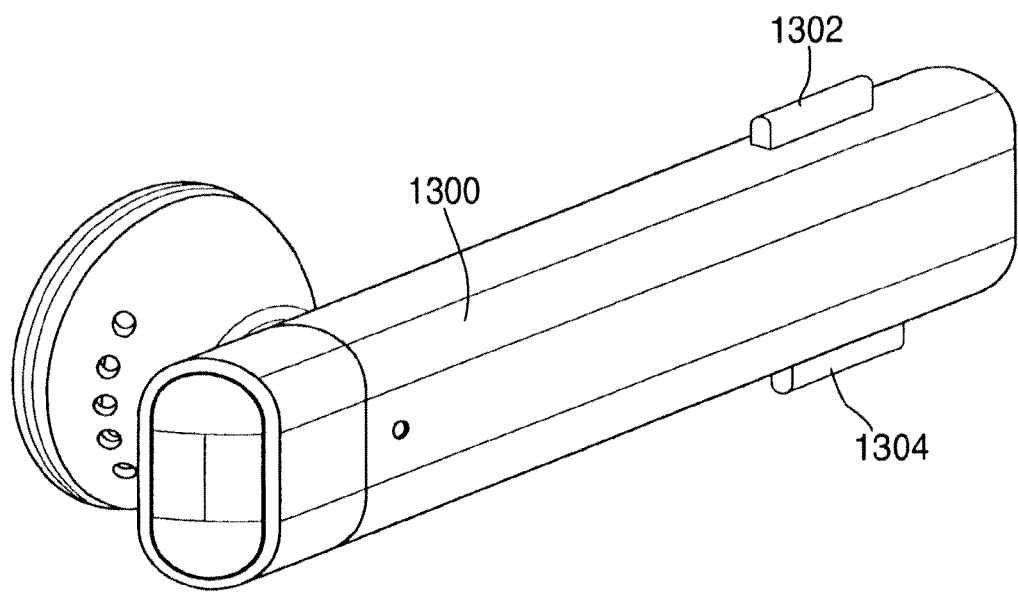
FIGS. 13A-13B illustrate components that can be presented in accordance with some embodiments of the present invention.
Figure 13B:
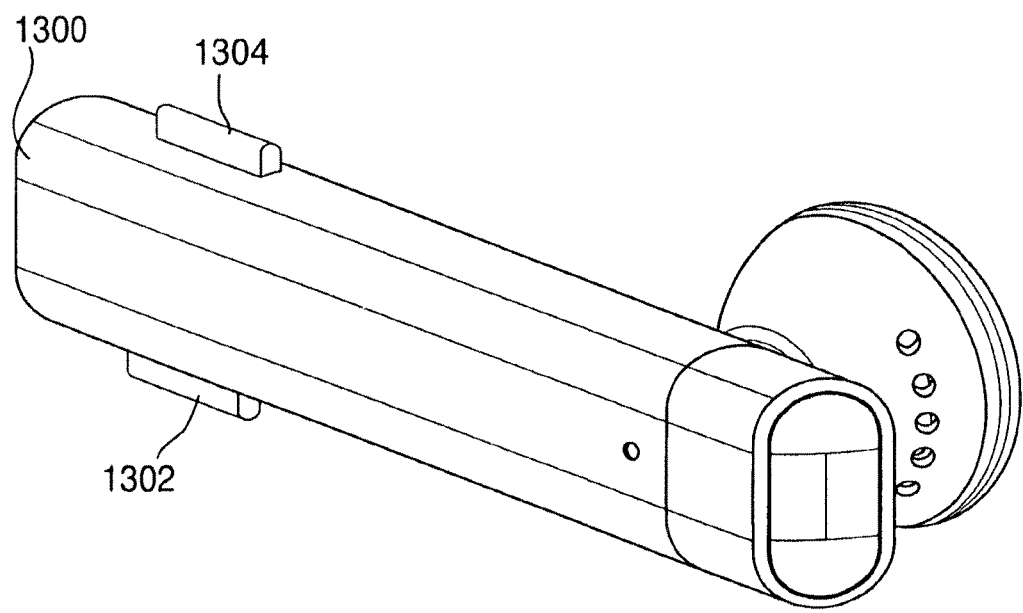

In another embodiment of the present invent on, an accelerometer can be used to control button functions of a wireless headset. This embodiment could be most useful when the button functions are related to the position of the wireless headset. For example, FIGS. 13A and 13B shows wireless headset 1300 with two volume buttons, button 1302 and button 1304. If a user is wearing wireless headset 1300, he or she may intuitively expect the volume-up button to be on top of wireless headset 1300 and the volume-down button to be on the bottom of wireless headset 1300. However, depending on the orientation of wireless headset 1300, the position of the buttons can change.

For example, FIG. 13A illustrates the orientation of wireless headset 1300 if the headset is being worn on a user's right ear. In this case, button 1302 is on top of wireless headset 1300 and button 1304 is on the bottom of wireless headset 1300. Thus, in this case, the user may intuitively expect button 1302 to perform the volume-up function and button 1304 to perform the volume-down button. However, FIG. 13B illustrates a case where the same wireless headset 1300 is being worn on a user's left ear. In this scenario, button 1302 is now on the bottom of wireless headset 1300 and button 1304 is on the top of button 1302. Thus, if button 1302 always performs the volume-up function but wireless headset 1300 is being worn in the orientation illustrated by FIG. 13B, a user may accidentally use the incorrect buttons to control the volume. Thus, an accelerometer can be used to sense the orientation of wireless headset 1300. The information sensed by the accelerometer can then be sent to a processor which can control button functions accordingly. For example, if the accelerometer senses that button 1302 is on top (i.e., as illustrated by FIG. 13A), the processor can instruct button 1302 to perform the volume-up function. On the other hand, if the accelerometer senses that button 1304 is on top (i.e., as illustrated by FIG. 13B), the processor can instead instruct button 1304 to perform the volume-up function.

In another embodiment of the present invention, the accelerometer can alternatively or additionally be used as a pedometer. The accelerometer can sense the footsteps taken by a user, and then send this information to a processor located either in the wireless headset or in a handset in communication with wireless headset. For example, the accelerometer can sense a user's footsteps and then send this information on a Bluetooth™ side channel to the handset. Since the wireless headset, and thus the "pedometer", will typically always be located on the user's ear, this system can be easy to calibrate and can have accurate, reliable results. Additionally, the processing of the accelerometer's information is not limited to a handset. Rather, any suitable Bluetooth™ device or device that is in communication with the wireless headset may be used such as, for example, a personal data assistant (PDA), media player, health device, personal computer, etc.

Various configurations described herein may be combined without departing from the present invention. The above described embodiments of the present invention are presented for purposes of illustration and not of limitation. The present invention also can take many forms other than those explicitly described herein. Accordingly, it is emphasized that the invention is not limited to the explicitly disclosed methods, systems and apparatuses, but is intended to include variations to and modifications thereof which are within the spirit of the following claims.

What is claimed is:

1. A method comprising:
   receiving with a wireless headset an audio signal;
   in response to the receiving, transmitting the received audio signal from the wireless headset to an external device that is in communication with the wireless headset wherein the transmitted audio signal is processed with the external device; and
   controlling with the external device a noise cancellation system of the wireless headset based on the processed audio signal, wherein processing the transmitted audio signal with the external device comprises comparing an amount of ambient noise that is present in the transmitted audio signal to a cutoff value; and the controlling the noise cancellation system comprises turning off at least part of the noise cancellation system based on the result of the comparing of the amount of ambient noise relative to the cutoff value.

2. The method of claim 1, wherein the external device that is in communication with the wireless headset comprises a cellular telephone.

3. The method of claim 1, wherein the cutoff value is a first cutoff value, wherein:
   processing the transmitted audio signal with the external device further comprises determining that an amount of ambient noise that is present in the transmitted audio signal is greater than a second cutoff value; and
   the controlling the noise cancellation system comprises turning on the noise cancellation system in response to a determination that the amount of ambient noise is greater than the second cutoff value.

4. The method of claim 1, further comprising:
   transmitting a position signal from the wireless headset to the external device, wherein the position signal is indicative of an angular position of the wireless headset wherein the transmitted position signal is processed with the external device.

5. The method of claim 4, wherein the controlling the noise cancellation system for the wireless headset comprises controlling the noise cancellation system based on the processed position signal.

6. The method of claim 1, wherein the turning off at least part of the noise cancellation system comprises turning off all but one omni-directional microphone of a plurality of omni-directional microphones of the noise cancellation system.

7. The method of claim 1, wherein the controlling the noise cancellation system further comprises discarding at least a portion of the received audio signal that is received from outside of a cone-shaped region that extends from the wireless headset.

8. The method of claim 7, wherein the controlling the noise cancellation system further comprises:
   determining an angular position of the wireless headset; and
   in response to the determining the angular position of the wireless headset, determining a size of the cone-shaped region based on the determined angular position.

9. A machine readable non-transitory storage medium containing executable instructions which when executed by a data processing system cause the system to perform a method comprising:
   receiving at an external device, an audio signal from a wireless headset that is in communication with the external device;
   processing the received audio signal with the external device; and
   in response to the processing the audio signal, controlling with the external device a noise cancellation system of the wireless headset based on the processed audio signal, wherein the processing the audio signal with the external device comprises comparing an amount of ambient noise that is present in the audio signal to a cutoff value, wherein; and the controlling the noise cancellation system comprises causing at least part of the noise cancellation system to be turned off based on the result of the comparing of the amount of ambient noise relative to the cutoff value.

10. The machine readable non-transitory storage medium of claim 9, wherein the external device that is in communication with the wireless headset comprises a cellular telephone.

11. The machine readable non-transitory storage medium of claim 10, wherein the cutoff value is a first cutoff value, wherein:
the processing the audio signal with the external device comprises determining that an amount of ambient noise that is present in the received transmitted audio signal is greater than a second cutoff value; and
the controlling the noise cancellation system comprises causing the noise cancellation system to be turned on in response to a determination that the amount of ambient noise is greater than the second cutoff value.

12. The machine readable non-transitory storage medium of claim 9, the method further comprising:
receiving, at the external device, a position signal from the wireless headset, wherein the position signal is indicative of an angular position of the wireless headset; and
processing the position signal with the external device.

13. The machine readable non-transitory storage medium of claim 12, wherein the controlling the noise cancellation system for the wireless headset comprises controlling the noise cancellation system based on the processed position signal.

14. The machine readable non-transitory storage medium of claim 9, wherein turning off at least part of the noise cancellation system comprises turning off all but one omni-directional microphone of a plurality of omni-directional microphones of the noise cancellation system.

15. The machine readable non-transitory storage medium of claim 9, wherein the controlling the noise cancellation system further comprises discarding at least a portion of audio signal that is received from outside of a cone-shaped region that extends from the wireless headset.

16. The machine readable non-transitory storage medium of claim 15, wherein the controlling the noise cancellation system further comprises:
determining an angular position of the wireless headset; and
in response to the determining the angular position of the wireless headset, determining a size of the cone-shaped region based on the determined angular position.

* * * * *